United States Patent [19]
Cox

[11] Patent Number: 5,029,740
[45] Date of Patent: Jul. 9, 1991

[54] LUGGAGE RACK FOR VEHICLES

[76] Inventor: Gary L. Cox, 1671 Troy Ct., Kemmerer, Wyo. 83101

[21] Appl. No.: 520,098

[22] Filed: May 7, 1990

Related U.S. Application Data

[63] Continuation-in-part of Ser. No. 308,795, Feb. 7, 1989, abandoned.

[51] Int. Cl.⁵ ............................................. B60R 9/06
[52] U.S. Cl. ..................... 224/42.01; 224/42.03 A; 224/42.08; 224/42.44; 190/15.1; 280/415.1
[58] Field of Search ................ 224/42.03 R, 42.03 A, 224/42.08, 42.07, 310, 328, 42.01, 42.43, 42.44; 280/415.1, 30; 414/462, 498, 546; 190/15.1, 18 A

[56] References Cited

U.S. PATENT DOCUMENTS

| | | | |
|---|---|---|---|
| 1,913,256 | 6/1933 | Widener | 224/42.44 |
| 2,551,901 | 5/1951 | Richardson | 224/42.44 |
| 2,809,046 | 10/1957 | Andersson | 224/42.08 |
| 3,923,219 | 12/1975 | Glover et al. | 224/42.03 A |
| 4,593,840 | 6/1986 | Chown | 224/42.03 A |
| 4,744,590 | 5/1988 | Chesney | 224/42.08 |
| 4,907,728 | 3/1990 | Giblet | 224/42.03 A |

Primary Examiner—Linda J. Sholl
Attorney, Agent, or Firm—M. Reid Russell

[57] ABSTRACT

A luggage rack assembly for vehicles that includes a support mechanism with a support arm releasably and adjustably attached to a vehicle, a wheeled transport mechanism releasably locked to the support arm and having arms pivotally connected to the support mechanism so that the transport mechanism is movable from a raised position locked to the support arm and a ground engaging position and a container for luggage and the like, releasably locked to the transport mechanism.

18 Claims, 4 Drawing Sheets

LUGGAGE RACK FOR VEHICLES

BACKGROUND OF THE INVENTION

This application is a continuation-in-part of application Ser. No. 308,795, filed Feb. 7, 1989, now abandoned.

FIELD OF THE INVENTION

This invention relates to luggage racks for use on vehicles and is particularly concerned with racks that are adapted to be mounted exteriorly of the vehicle, on the front or rear of the vehicle and will provide easily accessible, additional storage for the user of the vehicle.

PRIOR ART

A number of luggage carriers, to be used exteriorly of a vehicle have been known and proposed in the past. Some of the carriers of which I am familiar, are disclosed in U.S. Pat. Nos. 3,202,332, 3,334,761, 3,999,693, 4,320,862, and 4,671,439. In U.S. Pat. No. 3,202,332, there is shown a luggage carrier that attaches to the rear of an automobile. This '232 luggage carrier pivotally swings out and away from the vehicle and includes a support leg for supporting the carrier in its pivoted attitude, and a support platform that is carried by the vehicle for securing the luggage carrier to the vehicle. Another U.S. Pat. No. 3,334,761, discloses an article carrier that attaches to the rear end of an automobile and provides for tilt-dumping of the contents of the article carrier. Additionally, a U.S. Pat. No. 3,999,693, discloses a portable luggage carrier for compact cars that essentially provides an extension of the rear end of the vehicle to which the device is attached. This '693 luggage carrier includes an extension for the gas filler tube of the vehicle and tail lights and other rear lights and accessories, including a bumper, that correspond to similar components of the vehicle itself. Also, a U.S. Pat. No. 4,320,862, discloses an automobile baggage container that has a streamlined configuration to reduce wind drag and that attaches to the rear of a vehicle by straps and that further includes the attachment of extension means to provide additional bumper and tail light structure on the carrier itself. Further, a U.S. Pat. No. 4,671,439, discloses a luggage carrier apparatus that includes a container that is adapted to be attached to the back of a mini-van or the like. The container includes a rearwardly pivoting lid that will not come in contact with the rear of the vehicle as it opens and closes, special latches and locking mechanisms to insure that the luggage carrier lid will not open when the vehicle is moving and to prevent unauthorized access thereto. Additionally, a specially mounted apparatus is provided for connecting the luggage carrier to the vehicle to be easily attachable to or removable from the vehicle by authorized persons, but is difficult to remove by an unauthorized person.

Other patents with which I am familiar that disclose luggage carrying devices for use with motor vehicles include U.S. Pat. Nos. 2,809,046 and 4,744,590.

U.S. Pat. No. 2,809,046, discloses a folding luggage rack and trailer for motor cars. As disclosed in the '046 patent, the rack includes mutually articulated rectangular sections arranged to be folded into a stowed, non-load carrying position at the rear of a vehicle or to be extended from the vehicle and to then carry loads placed thereon. A wheel is attached to provide road engaging support beneath the rectangular frames, if necessary to support the loads placed thereon. The rectangular sections, however, only support a load when extended from the vehicle.

U.S. Pat. No. 4,744,590, discloses a removable attachable suspended trailer device that includes a load supporting frame that is cantilevered from a vehicle. Wheels are provided to be positioned beneath the frame and to be used when the frame and a load are rolled away from the vehicle for unloading.

There has remained a need for a luggage carrier that can be easily transported to and from the vehicle to which it is to be attached; that can be easily attached and used in a ground engaging position and that can be readily lifted, even when full of luggage, by users to a raised storage position with respect to the vehicle; and that will still allow easy access to the rear door or doors of the vehicle without first unloading the contents of the container.

OBJECTS OF THE INVENTION

Principal objects of the present invention are to provide a luggage storage unit that can be readily attached to a vehicle and that is easily used.

Still other objects are to provide such a luggage storage system with a luggage carrier that is easily transported over the ground, and into and out of hotels, houses, and the like, and that can then be attached to the vehicle and easily lifted into an elevated carrying position closely against the vehicle, while loaded, even by persons not capable of lifting large loads.

It is a further object to provide a luggage storage system with a luggage carrier that is safely and securely locked in place when in its elevated carrying position and that can be easily released and lowered to ground for loading and removal from and attachment to a fixed component of a lifting assembly.

FEATURES OF THE INVENTION

Principal features of the invention include a luggage rack assembly having a vehicle attachable lifting mechanism with fixed and movable components, and a separate and removable attachable luggage storage carrier.

In one preferred embodiment, a separate and removable attachable transport mechanism, with wheels, is provided to receive the luggage storage carrier, and to be attached through the movable component to the fixed component of the lifting mechanism.

In another preferred embodiment, the luggage storage carrier itself is provided with wheels and is pivotally secured through the movable component to the fixed component of the lifting mechanism so as to pivot if it engages the ground during vehicle travel.

The vehicle affixed lifting mechanism is preferably attached to the vehicle using conventional hitch mechanisms. The transport mechanism with carrier or the carrier itself, is attached to the lifting mechanism such that merely pushing or pulling on the luggage storage carrier causes it to raise the storage carrier (even when fully loaded) into an elevated carrying position or to lower it to place supporting castor wheels in ground engagement.

Automatic latching is provided for the luggage storage carrier as it is moved into position against the fixed component of the lifting mechanism and safety latching is provided to insure inadvertent release of the luggage storage container.

Additional objects and features of the invention will become apparent to those skilled in the art from the following detailed description and drawings.

THE DRAWINGS

DETAILED DESCRIPTION OF THE INVENTION

Figure 1:
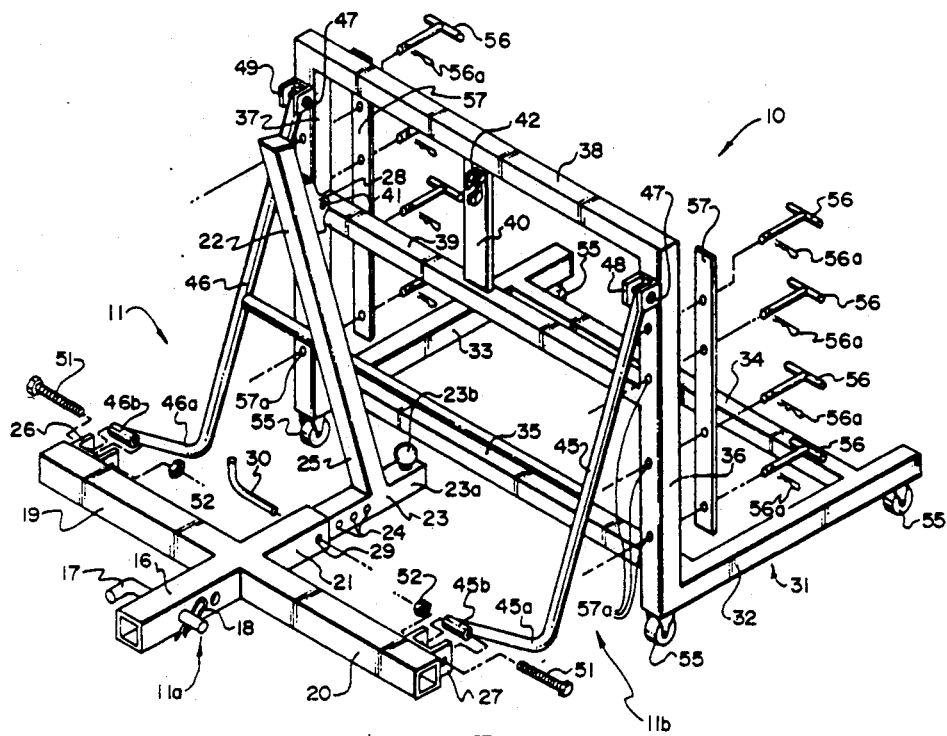
FIG. 1 is an exploded perspective view showing a first embodiment of the luggage rack assembly of the invention, separated from a vehicle.
Figure 2:
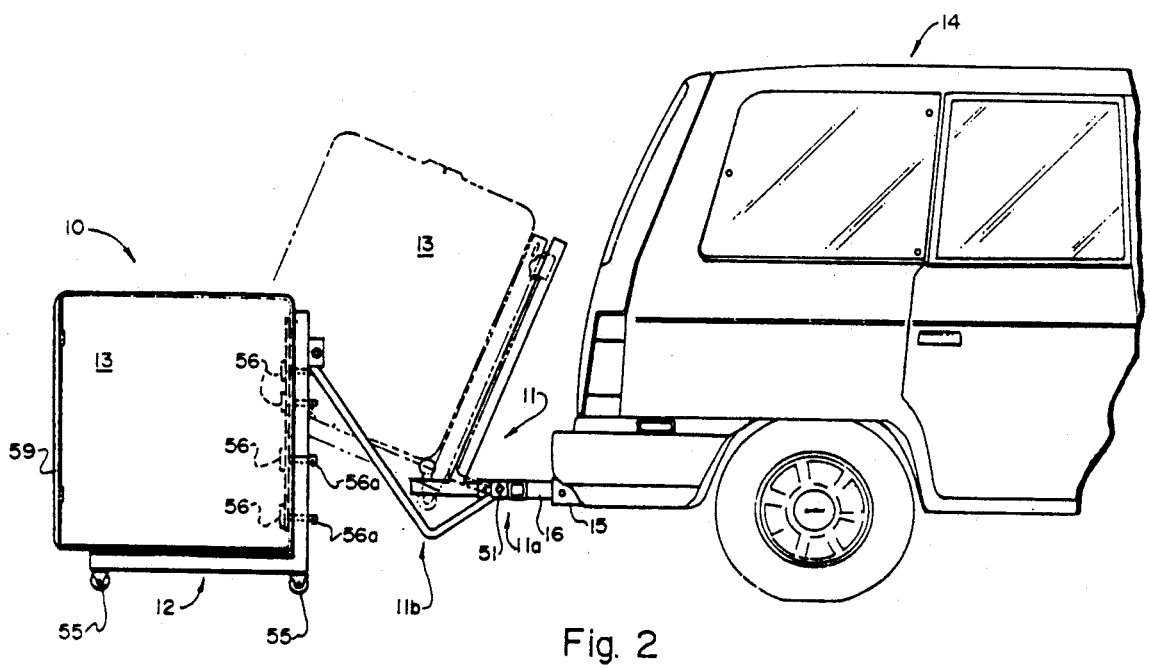
FIG. 2, is a side elevation view of the luggage rack assembly as attached to a vehicle and showing luggage rack in a lowered position in solid line and in a raised position in phantom lines.

Referring now to the drawings:

In the illustrated preferred embodiment of FIGS. 1 and 2, the luggage rack assembly of the invention is shown generally at 10. As shown, the luggage rack assembly includes a lifting mechanism 11, a transport mechanism 12, and a luggage storage carrier 13. The lifting mechanism 11 is adapted to be affixed to a vehicle, such as the van-type vehicle shown generally at 14. The lifting mechanism includes a fixed component 11a and a movable component 11b.

As shown, vehicle 14 is equipped with the usual trailer hitch reception member 15 that is made of squared steel tubing, or the like. The fixed component 11a of lifting mechanism 11, includes squared tubing insert 16 that is adapted to be inserted into reception member 15 and is to be locked in place by a pin 17 inserted through matching holes in the receiving member 15 and the insert members 16. A lock pin 18 then secures the pin 17 from withdrawal. A squared tube extension 21 projects from the insert member 16 to provide a socket for an angled lift member 22. Lift member 22 is preferably made from square bar stock and includes a lower leg 23 having holes 24 spaced therealong and an upwardly angled leg 25. An acute angle is formed between the legs 23 and 25. Another segment 23a may extend from leg 23 beyond angled leg 25 to support a trailer hitch ball 23b, that will allow a towed trailer to be attached and pulled by vehicle 14 even when the luggage rack assembly is in use.

A clevis 26 is provided at the outer end of arm 19 and a similar like facing clevis 27 is provided at the outer end of arm 20. Another clevis 28 is mounted to the leg 25 adjacent an upper end thereof, facing the same direction as each clevis 26 and 27.

The holes 24 in leg 23 are adapted to align with a hole 29 in the square tube extension 21 such that a pin 30 can be inserted through the hole 29 and aligned holes 24 to secure the member 22 to that square tube extension 21.

The clevises 26, 27 and 28 of the lifting mechanism 11, provide means for attachment of the transport mechanism 12 to the lifting mechanism.

Transport mechanism 12 includes a wheeled frame 31 having a horizontal frame that is made up of end rails 32 and 33, interconnected by cross-rails 34 and 35 and a vertical frame having cross-rails 38 and 39. A vertical brace 40 interconnects the cross-rails 38 and 39 intermediate their length.

Clevis 28 has a pin 41 extending thereacross and pin 41 is arranged to be engaged by a latch assembly 42 that is carried by the brace 40.

The movable component 11b of lifting mechanism 11 includes a pair of pivot arms 45 and 46, respectively attached to the vertical legs 36 and 37 by pins 47 that are inserted through clevises 48 and 49, that are, respectively, attached to the legs 36 and 37 and through the ends of the respective arms 45 and 46. Arms 45 and 46 also each include a right angle portion 45a and 46a, respectively, with transverse tubes 45b and 46b secured across their ends, respectively. The tubes 46b and 45b fit, respectively, into clevis members 26 and 27 with pivot pins 51 fitted through the clevis members and the inserted tubes and are held in place by nuts 52 turned over the pin 51 and such that the arms 45 and 46 will pivot about the pins 51.

Castor wheels 55 are provided at each of the corners of base platform 31 as means for moving the transport mechanism over the ground.

The luggage storage carrier 13 is adapted to be rested on the base platform 31 and against the upright frame and is secured to the upright members 36 and 37. Shown in FIGS. 1 and 2, fasteners 56 are inserted through holes in reinforcement straps 57 located inside of luggage storage carrier 13, through holes formed in the rear wall of the luggage carrier and through holes 57a in the legs 36 and 37. The fasteners 56 are held in place by fitting cotter pins 56a inserted through the ends of fasteners 56, thereby holding the luggage storage carrier 13 securely to the transport mechanism 12.

Figure 3:
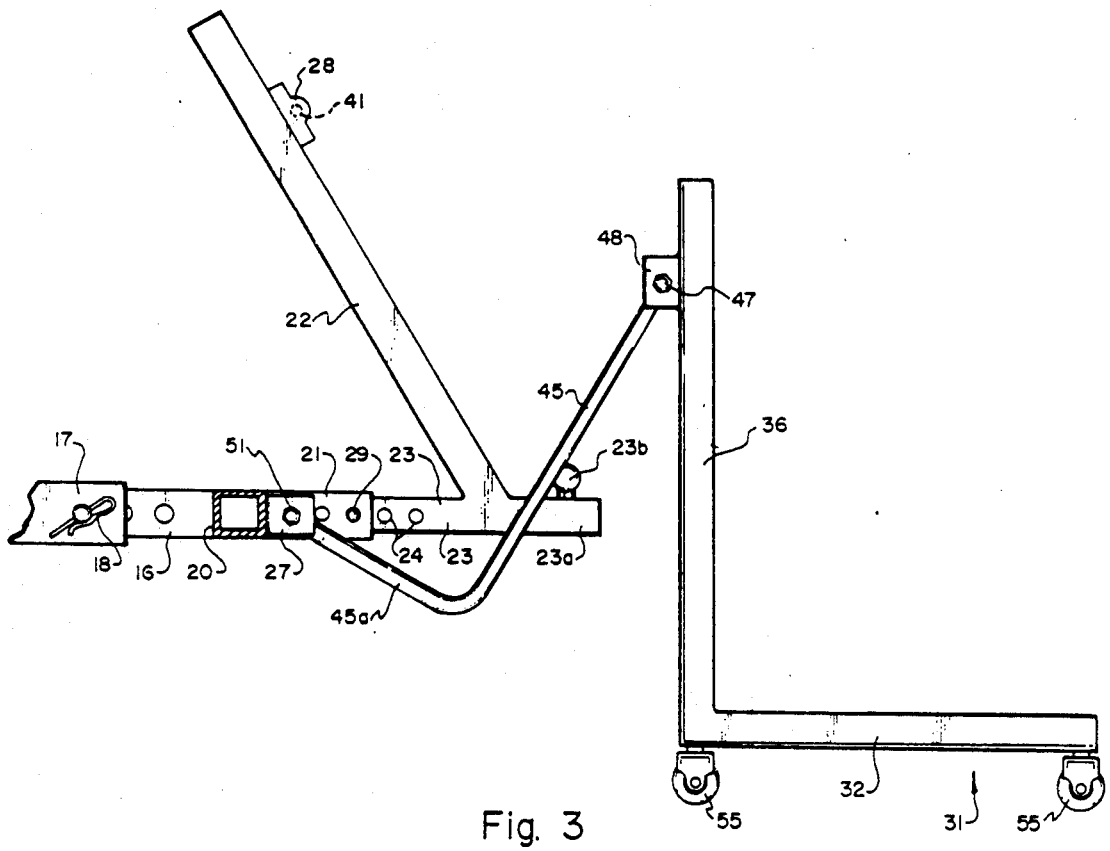
FIG. 3, is an enlarged side elevation view of the support mechanism and transport mechanism in a lowered, ground engaging position.
Figure 4:
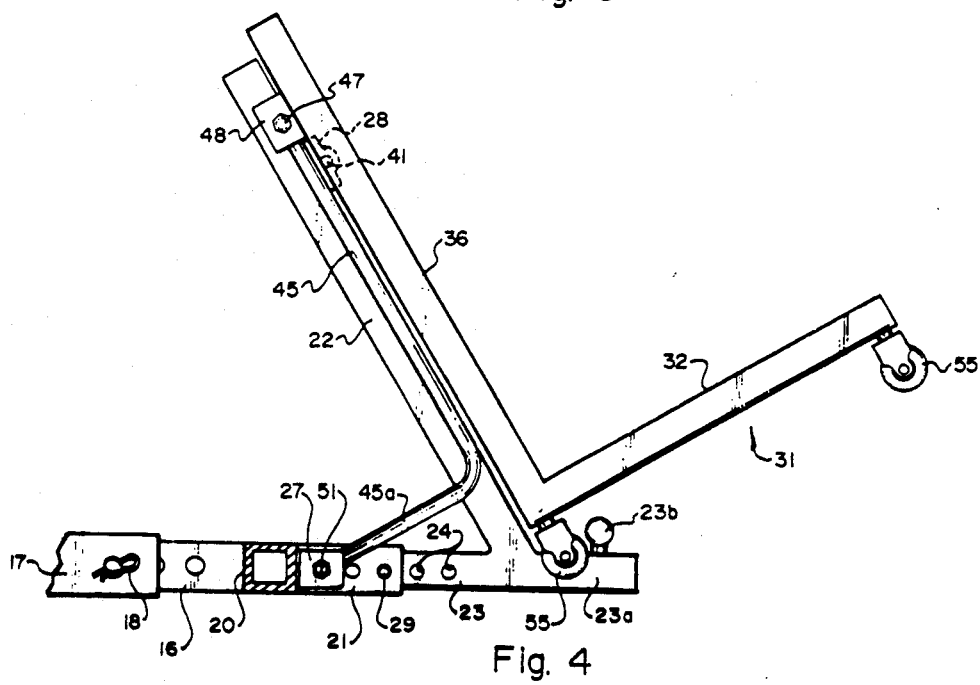
FIG. 4, is a view like FIG. 3, but showing the transport mechanism in a raised position, locked to the support arm.

In operation, the luggage storage carrier 13 is positioned on the transport mechanism 12 and is secured in place, as set out above. Thereafter desired contents are placed in the storage carrier 13 through doors 59 at the rear thereof. While the storage carrier 13 having rear doors is preferred, it will be apparent that other access means can be provided, through a side or top thereof, for example. Once the storage carrier 13 is in position on the transport mechanism 12, by releasing the pins 51 out from clevises 27 and 26 and tube end 45b and 46b of pivot arms 45 and 46, the transport mechanism 12 can be freely wheeled to any location desired by a user. Thus, for example, the transport mechanism and storage carrier can be wheeled into a hotel room or a house, and can then be easily returned for attachment to the vehicle. It will be apparent that such arrangement makes it very convenient for a user to temporarily remove and then replace the storage carrier onto the vehicle. When the luggage storage carrier 13 and transport carrier mechanism 12, with the movable component 11b of the lifting mechanism 11, i.e., the arms 45 and 46 pivotally attached by pins 47, are moved to the vehicle (FIGS. 1, 2 and 3), the transport mechanism is attached to the lifting mechanism 11 by insertion of pins 51 through the clevis 27 and 26 and tube ends 45b and 46b. Thereafter, pushing on the luggage storage carrier 13 causes the arms 45 and 46 to pivot upwardly about pivot pins 51 and to then swing the transport mechanism into engagement with the arm 22 such that latching assembly 42 removably interlocks with pin 41 (FIG. 4). To release the transport mechanism and luggage storage carrier from the vehicle, it is only necessary to release latch assembly 42 and to allow the unit to drop under the influence of gravity. A user merely stabilizes the assembly as it is lowered to prevent any damage from a free fall.

It will be apparent that the distance maintained from the luggage rack assembly and the vehicle is adjustable merely by the selection of a hole 24 to be aligned with a hole 29 and that alignment to be locked with pin 30. Thus, it is possible to maintain the luggage rack assembly close against the rear of the vehicle, or to position it further away so that access can be had to the rear door of the vehicle, if desired.

In the embodiment of the invention, shown in FIGS. 5 through 8, the luggage rack assembly is shown generally at 60. As shown, the luggage rack assembly includes a lifting mechanism 61 having a fixed component 61a, a movable component 61b, and a luggage storage carrier 63.

Figure 5:
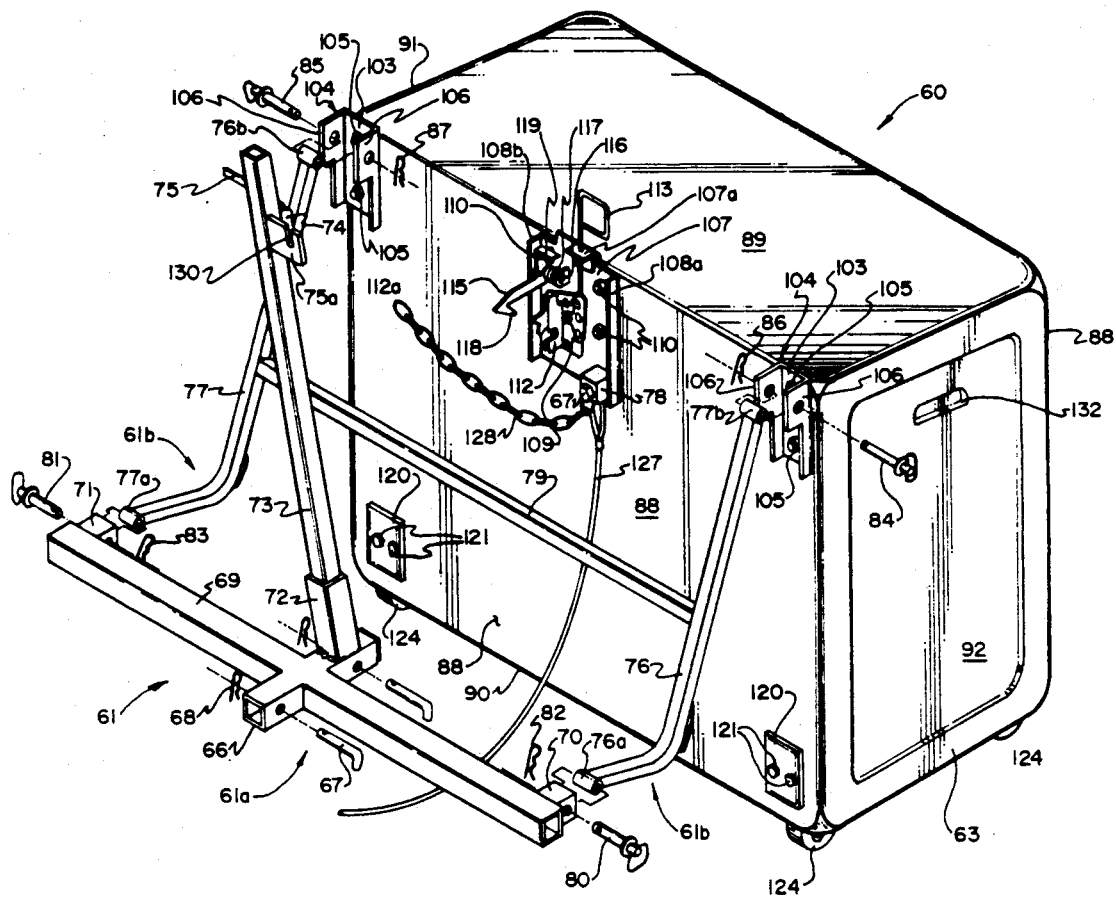
FIG. 5, is a view like that of FIG. 1, but showing an alternate preferred embodiment of the invention.
Figure 6:
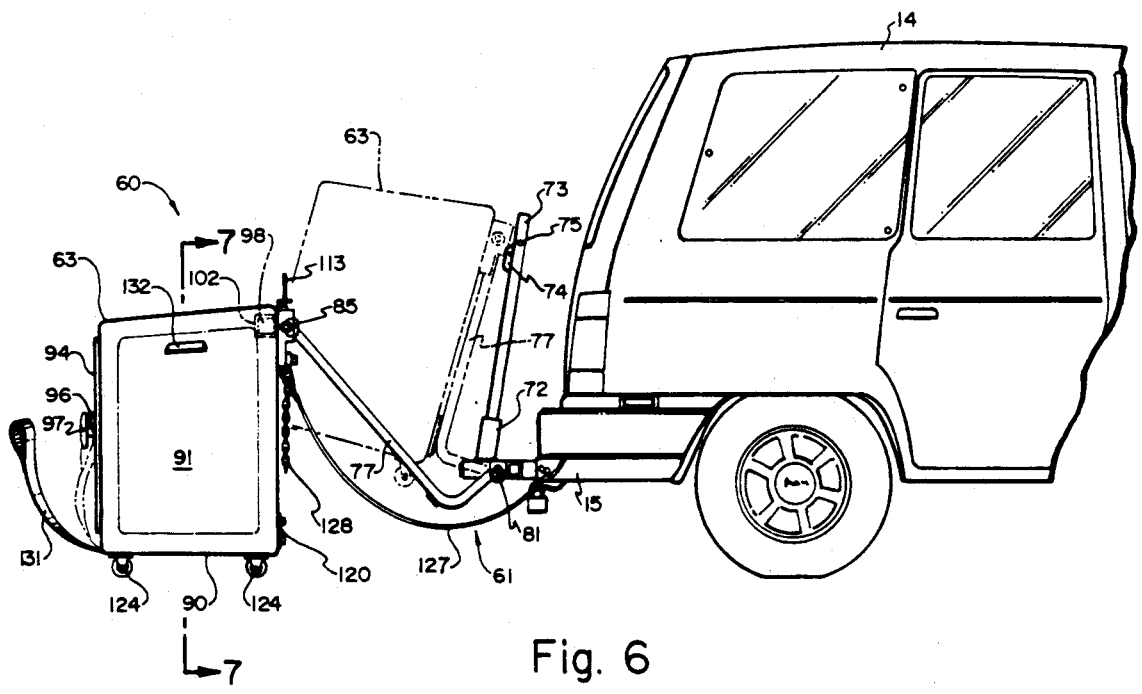
FIG. 6, is a view like that of FIG. 2, but showing the embodiment of FIG. 5.

The fixed component 61a of the lifting mechanism 61 includes a squared tubing insert 66 that is adapted to be inserted into a reception member, such as shown at 15 on the vehicle shown in FIGS. 1 and 6. The insert 66 is locked into the reception member by a pin 67, shown best in FIG. 5, that is inserted through matching holes in the receiving and insert members. A kotter key 68 inserted through a hole in pin 67 to secure the pin 67 from withdrawal.

Insert 66 is formed integrally with a cross-member 69, that has squared arm receptacles 70 and 71 extending towards the vehicle from opposite ends thereof and further includes an upstanding squared socket 72. A lower end of a squared post 73 removably telescopes into the socket 72 to extend angularly upward from the insert. The upper end of the post 73 includes latch plate 74 affixed to the face thereof. A latch bar 75 projects from one side of the post 73, and a safety chain receiving plate 75a projects from an opposite side thereof. It should be apparent that post 73 can be separated from the insert 66 for more convenient storage.

The movable component 61b of the lifting mechanism includes a pair of spaced apart curved arms 76 and 77, that are interconnected by brace 79. The arms 76 and 77 are preferably made of squared tubing with sleeve ends 76a and 77a thereof to respectively telescope into the receptacles 70 and 71. Pivot pins 80 and 81 are inserted through holes provided therefore through receptacles 70 and 71 and through the sleeve ends 76a and 77a, to provide pivot couplings, which pins 80 and 81 are locked in place by kotter keys 82 and 83 that are inserted through end of the pins 80 and 81, respectively. The other, upper ends of arms 76 and 77 also have sleeve ends 76b and 77b secured thereto that have holes therethrough to respectively receive pivot pins 84 and 85 that fit through right angle brackets 104 as set out below and are then secured in place by kotter keys 86 and 87 that are, respectively, inserted through ends of the pivot pins 84 and 85.

Figure 8:
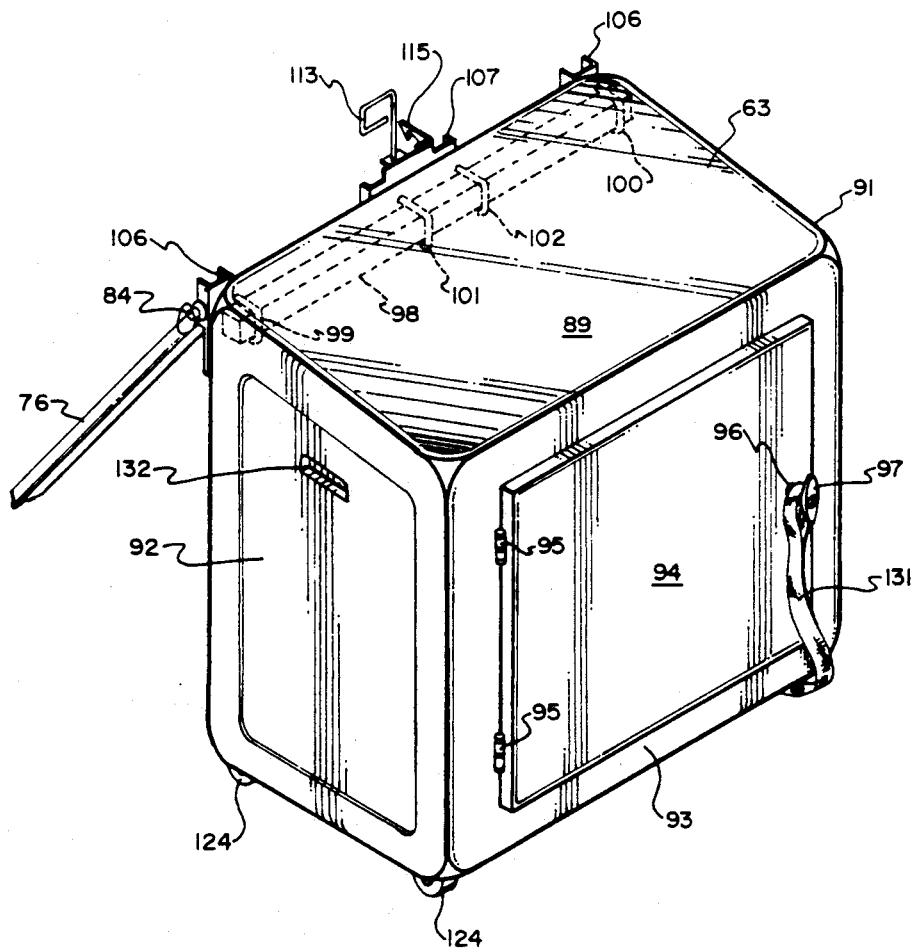
FIG. 8, is a perspective view, taken from the rear and above of the container.

The carrier 63 is of generally box like configuration with a front wall 88, top 89, bottom 90, sidewalls 91 and 92, and a rear wall 93 having an opening therethrough that is closed by a door 94 that is hinged at 95 and is secured in a closed position by a latch 96 that includes a turning handle 97, shown in FIG. 8.

Figure 7:
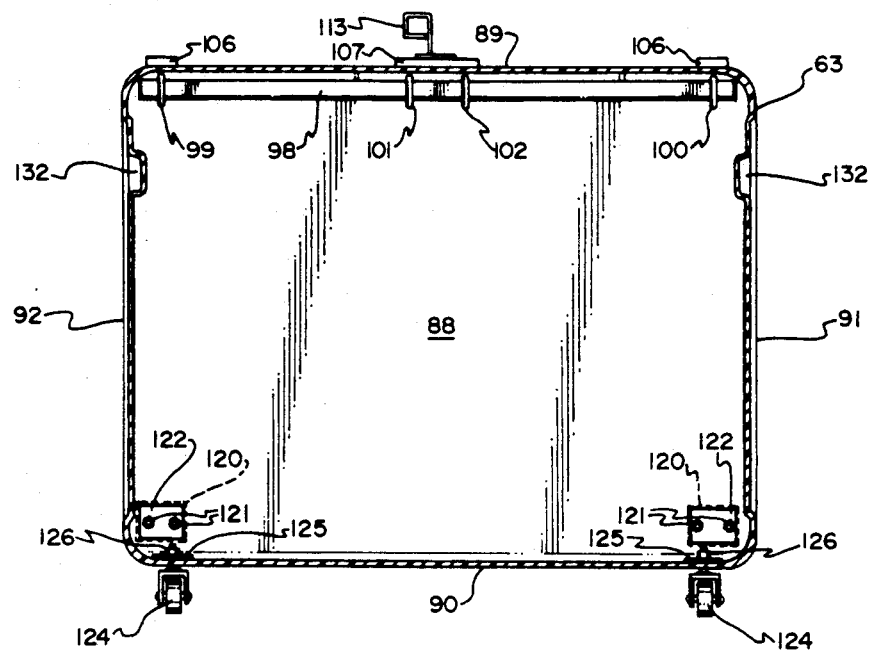
FIG. 7, is a vertical section, taken on the line 7—7 of FIG. 6.

A reinforcement bar 98, shown in FIGS. 7 and 8, extends across the interior surface of front wall 88 and is held in place by U-bolts 99, 100, 101, and 102 that straddle the bar and the ends of which project through the front wall.

U-bolts 99 and 100, as shown in FIG. 5, each extend through a web 103 of right angle bracket 104 and have lock nuts 105 threaded thereon to secure the web 103 of the bracket to the front wall 88. So arranged, parallel legs 106 of the angle bracket 104 project at right angles from the wall and each leg 106 has a hole therethrough, that are aligned to pass the pivot pins 84 and 85 therethrough and through sleeve ends 76b and 77b. The pins 84 and 85 thus become pivot connections for the luggage carrier 63 on the upper sleeve ends 76b, 77b of arms 76 and 77.

The U-bolts 101 and 102, straddle the reinforcement bar 98 and extend through a plate 107 that includes flanges 108a and 108b along opposite edges thereof with a latch box 109 mounted to which plate 107 between the flanges. The latch box is secured to front wall 88 by lock nuts 110 threaded onto the ends of the U-bolts 101 and 102.

The latch box 109 houses a conventional spring biased latch 112 that will engage and lock to the conventional latch plate 74 on the face of post 73 when the latch 112 is pushed into engagement with that plate. A release rod 113 having a handle end extends through a leg of a right angle bracket 107a, whose other is secured to plate 107, and into a top of latch box 109 to provide by its lifting, the release of latch 112 from latch plate 74. In addition, a safety hook 115 is pivotally mounted to plate 107 at 116 and is biased by a spring 117 connected between the hook and the plate to a latching position. The hook 115 has a curved fish hook nose end 118 that will engage the latch bar 75 to cam the hook over the bar when the latch box is moved to receive the latch 112 to the latch plate 74. Consequently, upon release of the latch 112 from latch plate 112a, by actuation of release rod 113, a slight pivoting of the arms 76 and 77 will occur and hook 115 will engage latch bar 75 to prevent further rotation of the arms 76 and 77 a and lowering of the container 63.

Hook 115 has a right angle handle 119 that projects from the pivot 116 and a downward push on the handle 119 will pivot the hook 115 that is operated manually to clear the fish hook nose end off from the latch bar 75, to allow the carrier 63 to be pivoted to a lowered, ground engaging position.

Wear plates 120 are provided at the opposite lower corners of front wall 88 of carrier 63. The wear plates are secured to front wall 88 by bolts 121 that are inserted through the wear plates, wall and load distribution plates 122 located on the inside of the carrier. The wear plates 120 will contact arms 76 and 77. Shown in FIG. 7, the mounting shaft or bolt of a conventional castor wheel 124 extends through a bottom 90 and through a support plate 125, and secured with lock nuts 126. Similarly mounted are three additional castor wheels 124 onto support plates 125 at each of the bottom 90 corners.

As a further precautionary measure against inadvertent and undesired release and loss of the container, a flexible safety cable 127 has one end connected to the pin 67 and its other end adapted to be secured at one end to a mount 78 and has its other end looped around brace 15 (FIG. 6) and is then secured to itself, such as with a padlock.

A safety chain 128 is provided to further prevent inadvertent release of the carrier 63 from the fixed component of the lifting mechanism. Chain 128 has one end fixed to mount 78 and is adapted to be fitted into a keyhole slot 130 that is formed in the safety chain receiving plate 75a.

In use, the arms 76 and 77 are connected to brackets 104 and the container is filled with luggage or such other items as may be desired. The door 94 is closed and locked, the carrier 63 is moved to the vehicle and arms 76 and 77 are connected to the fixed lifting component 61a by pivot pins 80 and 81. Thereafter, the carrier is pushed towards the vehicle. This pivots arms 76 and 77 about the pivot pins 80 and 8 and the carrier about pivot pins 84 and 85 to thereby lift the carrier. A flexible lift strap 131, FIGS. 6 and 8, is fixed to a support plate 125 by a bolt 121 to beneath the carrier to be used to help lift the carrier. The lift strap may be attached to handle 97 for prevention of unwanted door opening during travel.

The pushing and lifting of the carrier is continued until safety hook 115 engages and clears latch bar 75 and the latch 112 is secured to latch plate 74. The safety cable 127 and the safety chain 128 are secured and the luggage rack assembly 60 is ready to travel with the vehicle.

In the event the vehicle and luggage rack assembly pass over a dip in the road that would cause the castor wheels 124 on the carrier 63 to engage the road, the carrier will pivot about the pivot pins 84 and 85 and will raise and lower, without damage to the carrier, as the vehicle passes over the dip.

To release the carrier 63 from the vehicle it is only necessary to release the safety cable 127 and safety chain 128 and pull the release rod 113. This releases latch 112 and allows the carrier to pivot slightly downward until hook 115 engage latch bar 75. Handle 119 is then pivoted to release hook 115 from latch bar 75 and the carrier continues to rotate downwardly into ground engagement. Pins 80 and 81 are then removed to again release the carrier 63. Handles 132 may be formed in the sidewalls 91 and 92 of carrier 63 to facilitate maneuvering of the carrier 63.

Although a preferred form of my invention has been herein disclosed, it is to be understood that the present disclosure is by way of example and that variations are possible without departing from the subject matter coming within the scope of the following claims and a reasonable equivalency thereof, which subject matter I regard as my invention.

I claim:

1. A luggage rack assembly comprising a lifting mechanism having a fixed component arranged for connection to a vehicle and a movable component consisting of at least one member that has a lower end and an upper end, said movable component lower end for pivotal mounting to said fixed component; a luggage carrier that supports a container with a top at an upper end, a bottom at a lower end, front wall, rear wall, sidewalls that are interconnected along their edges and access means to the interior of said container; wheels and means for securing said wheels to the bottom of said luggage carrier; means for pivotally connecting the upper end of said movable component of the lifting mechanism to said luggage carrier adjacent to the intersection of the supported container front wall and top edges; means for releasably pivotally connecting said lower end of said movable component to said fixed component; and means for releasably securing said upper end of said luggage carrier to said fixed component during vehicle travel.

2. A luggage rack assembly as in claim 1, wherein the fixed component of the lifting mechanism fixed component comprises a trailer which insert means for attachment to a trailer hitch reception member on a vehicle; means for securing said trailer hitch insert means in the reception member; and a support post extending upwardly from said trailer hitch insert member when said trailer hitch insert means is secured in said trailer hitch reception member.

3. A luggage rack assembly as in claim 2, wherein the movable component of the lifting mechanism movable component comprises a pair of spaced apart interconnected arms.

4. A luggage rack assembly as in claim 3, wherein the means for securing said wheels to the bottom of the luggage carrier includes a support frame affixed to and for supporting the container.

5. A luggage rack assembly as in claim 4, wherein the means for releasably securing the upper end of the luggage carrier to the fixed component during which travel comprises, cooperating latch means that includes a latch plate and a latch bar that are carried by the support post and a latch hook assembly to engage the latch plate and a pivoted safety hook to engage said latch bar that are fixed to and carried by said luggage carrier.

6. A luggage rack assembly as in claim 3, further including a safety cable that has one end fixed to the trailer hitch reception member, with the opposite safety cable end fixed to the lifting mechanism.

7. A luggage rack assembly as in claim 6, further including a lift strap that has one end fixed to the bottom of the luggage carrier, with a loop as a handle means formed in said lift strap other end.

8. A luggage rack assembly as in claim 1, wherein means to releasably attach the support arm to the vehicle includes a trailer hitch insert to fit into a trailer hitch reception member on the vehicle; and pin means for installation through said trailer hitch insert and s id trailer hitch reception member to secure said trailer hitch insert in said trailer hitch reception member.

9. A luggage rack assembly as in claim 8, wherein the trailer hitch insert has a plurality of holes therealong through which the pin means may be selectively inserted to thereby change the distance between the vehicle and the support arm.

10. A luggage rack assembly comprising, a fixed component for attachment to a vehicle rear end that includes a support arm means for releasably attaching said fixed component to the vehicle rear end; a lifting assembly consisting of a pair of parallel bars that are connected by a cross member, said parallel bars having aligned ends which are pivotally connected to said fixed component, with the opposite parallel bar ends pivotally connected to a luggage carrier means; a rectangular container and means for mounting said rectangular container to said luggage carrier means; wheels and means for securing said wheels to the bottom of said rectangular container; and latch means for releasably securing said luggage carrier means to said support arm.

11. A luggage rack assembly as in claim 10, wherein the fixed component includes a trailer hitch insert means for attachment to a trailer hitch reception member mounted to a vehicle rear end, the support arm to extend upwardly therefrom.

12. A luggage rack assembly as in claim 11, where the support arm means is arranged for telescoping in a support arm receptacle that is secured to extend upwardly form the fixed component, adjacent to the trailer hitch insert means; and which support arm receptacle is tilted from the vertical towards the vehicle.

13. A luggage rack assembly as in claim 11, wherein the luggage carrier means is a bar for arrangement cross the inside of the rectangular container, proximate to the intersection of said rectangular container top and rear face; and means for securing said bar within said rectangular container and for securing to the rectangular container rear face the pivotal couplings that are for pivotally connecting to the opposite parallel bar ends of the lifting assembly parallel bars.

14. A luggage rack assembly as in claim 13, wherein a hook segment of the latch means is secured onto the rectangular container rear face for releasably coupling into a receptacle means secured to the fixed component support arm.

15. A luggage rack assembly as recited in claim 13, wherein one of the pair of pivotally coupled ends of the lifting assembly parallel bars is a release coupling and includes release pins that are arranged for releasably fitting through aligned holes formed in parallel clevis plates that extend from the fixed component or through aligned holes formed in parallel clevis brackets that extend from the rectangular container rear face, the release pins fitting also through sleeves that are secured across the parallel bar ends.

16. A luggage rack assembly as recited in claim 15, wherein the pivot couplings of both ends of the lifting assembly parallel bars are arranged by release couplings.

17. A luggage rack assembly as recited in claim 10, wherein the lifting assembly parallel bars are identically bent at aligned points therealong from the horizontal to vertical.

18. A luggage rack assembly as recited in claim 10, further including a lift strap that has one end fixed to the bottom of the rectangular container with a loop as a handle means formed in said lift strap other end.

* * * * *